United States Patent
Suzuki et al.

(12) United States Patent (10) Patent No.: US 6,537,624 B1
(45) Date of Patent: Mar. 25, 2003

(54) LIQUID-CRYSTAL FILM (75) Inventors: Shinichiro Suzuki, Kanagawa (JP); Suzushi Nishimura, Kanagawa (JP); Shinichi Komatsu, Kanagawa (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/582,266

(22) PCT Filed: Dec. 24, 1998

(86) PCT No.: PCT/JP98/05869

§ 371 (c)(1),
(2), (4) Date: Jun. 21, 2000

(87) PCT Pub. No.: WO99/34242

PCT Pub. Date: Jul. 8, 1999

(30) Foreign Application Priority Data

Dec. 24, 1997 (JP) .............................................. 9-354503
Apr. 23, 1998 (JP) .......................................... 10-113418
May 21, 1998 (JP) ............................................ 10-13932

(51) Int. Cl.⁷ ........................ C09K 19/02; G02F 1/1335

(52) U.S. Cl. .................... 428/1.3; 428/1.1; 252/299.01; 349/64; 349/98; 349/171; 349/175

(58) Field of Search .............. 428/1.1, 1.3; 252/299.01; 349/171, 175, 64, 98

(56) References Cited

U.S. PATENT DOCUMENTS

| | | | | |
|---|---|---|---|---|
| 4,652,626 A | * | 3/1987 | Orii et al. .................... | 528/194 |
| 4,746,722 A | * | 5/1988 | Iida et al. .................... | 528/194 |
| 5,081,221 A | * | 1/1992 | Watanabe et al. ........... | 528/308 |
| 5,093,025 A | * | 3/1992 | Koide et al. ........... | 252/299.01 |

* cited by examiner

*Primary Examiner*—Shean C. Wu
(74) *Attorney, Agent, or Firm*—Scully, Scott, Murphy & Presser (57) ABSTRACT

A light-diffusible liquid crystalline film having a fixed cholesteric or chiral smectic C orientation in which the helical axis direction is not uniformly parallel to the film thickness direction, as well as a liquid crystalline film having a fixed cholesteric or chiral smectic C orientation in which the helical axis direction is not uniformly parallel to the film thickness direction nor is the helix pitch uniformly equal in the film thickness direction, are provided.

14 Claims, 1 Drawing Sheet

LIQUID-CRYSTAL FILM

INDUSTRIAL APPLICATION FIELD

The present invention relates to a novel liquid crystalline film and the utilization thereof. Particularly, the invention is concerned with a cholesteric liquid crystalline film and a chiral smectic C liquid crystalline film, with suppressed specular reflection, as well as a novel liquid crystalline film capable of producing a diffracted light having polarizability, and the utilization of those films.

PRIOR ART

In a cholesteric liquid crystal, internal liquid crystal molecules thereof are oriented in a regularly twisted state so as to describe a helix in a film thickness direction, and the cholesteric liquid crystal possesses a unique optical property derived from the fact that the helical axis is parallel to the film thickness direction. This unique optical property is a selective reflection of a specific circularly polarized light in a specific wavelength band. This property may be applicable to an optical use in which only a right or left circularly polarized light is to be taken out from a non-polarized light or to an ornamental use which utilizes coloration of reflected or transmitted light because the above selection of a circularly polarized light is limited to a specific wavelength band. For industrial applications, a cholesteric liquid crystalline film obtained by forming a cholesteric liquid crystal into a thin film is considered to have a wide application range because it is easy to handle and is superior in processability.

As a method for forming a cholesteric liquid crystalline film there is known, for example, the method disclosed in Japanese Patent Laid Open No. 186534/1994. In conventional cholesteric liquid crystalline films, the helical axis is perpendicular to a substrate, and a layer structure corresponding to a helix pitch forms a flat sheet structure on the substrate. In such conventional cholesteric liquid crystalline films, an incident light is specularly reflected, and the luminance of reflected light drops rapidly outside the specular reflection area because of a marked viewing angle dependence of the luminance.

There also is known an example of having realized a linear polarizing plate by laminating a cholesteric liquid crystal layer and a quarter-wave plate to each other so that the helical axis of the cholesteric liquid crystal layer becomes perpendicular to the quarter-wave plate, as is disclosed in Japanese Patent Laid Open No. 133003/1989. In this polarizing plate, however, an incident light is reflected in an outer polarizing plate due to a specular reflection of the cholesteric liquid crystal layer, and the visibility as a polarizing plate is inferior.

In such a conventional liquid crystalline film as referred to above, the surface thereof has a metallic gloss and is in the state of a mirror surface. In case of applying this film to a use in which reflected light from the film is utilized, the direction of the reflected light is limited to a specific direction due to such specular reflection, giving rise to the problem that a sufficient luminance is not obtainable in other directions. Further, since the selectively reflecting wavelength band of this film is greatly dependent on the viewing angle due to a blue shift phenomenon, the color tone of reflected light varies markedly with the viewing angle.

As a method for suppressing a specular reflection there widely is known a method of diffusing incident light and reflected light. For realizing this method, however, it has so far been necessary to dispose a diffuser panel on the surface of an object to be measured. However, the use of a diffuser panel newly gives rise to problems such as an increase of cost and an increase in the number of manufacturing steps. Therefore, it is desired to develop a cholesteric liquid crystalline film not requiring such a diffuser panel, capable of suppressing a specular reflection, superior in visibility, and less dependent on the viewing angle.

The above points can also be said of a chiral smectic C liquid crystalline film, and also in this case it is desired to develop a chiral smectic C liquid crystalline film not requiring a diffuser panel, capable of suppressing a specular reflection, superior in visibility, and less dependent on the viewing angle.

Next, diffraction gratings are general-purpose optical elements used widely for the purpose of splitting a light beam in the field of spectrooptics. Diffraction gratings are classified into several types according to shapes thereof, usually into oscillation type diffraction gratings in which a light transmitting portion and a light non-transmitting portion are arranged periodically and phase type diffraction gratings in which periodical grooves are formed in a material of a high transmittance. Diffraction gratings are sometimes classified according to directions in which diffracted light is generated (Tetsuo Sueda, "How to use Optical Components and Points to be Noted," Optronics Co., ISBN4-900474-03-7).

According to the above conventional diffraction gratings, as a diffracted light obtained upon incidence of a natural light (non-polarized light), there can be obtained only a non-polarized light. With use of such a polarizing optical device as an ellipsometer which is used frequently in the field of spectrooptics, there can be obtained only a non-polarized light as a diffracted light, so for splitting a natural light emitted from a light source through a diffraction grating and for utilizing only a specific polarization component contained therein, there usually is adopted a method wherein a diffracted light is used through a polarizer. But this method involves the problem that about 50% or more of the diffracted light obtained is absorbed by the polarizer and that therefore the quantity of light is reduced by half. It is also required to use a detector of a high sensitivity and a light source capable of emitting a large amount of light. Thus, it is desired to develop a diffraction grating through which a diffracted light itself becomes a specific polarized light such as a circularly polarized light or a linearly polarized light.

OBJECT OF THE INVENTION

It is an object of the present invention to solve the above-mentioned problems of the prior art.

The present inventors have succeeded in forming an area which exhibits a high diffusion effect in a cholesteric liquid crystal layer and a chiral smectic liquid crystal layer by controlling the state of orientation of liquid crystal molecules precisely. More particularly, by forming a cholesteric orientation and a chiral smectic C orientation in which the helical axis direction in liquid crystal phase is not uniformly parallel in a film thickness direction, to suppress a specular reflection, we have succeeded in obtaining a cholesteric liquid crystalline film and a chiral smectic C liquid crystalline film both superior in visibility and having a light diffusing property.

First, by precisely controlling the state of orientation of liquid crystal molecules the present inventors have succeeded in forming an area of a high diffraction efficiency in a cholesteric liquid crystal layer or in a chiral smectic C liquid crystal layer. To be more specific, by controlling and fixing a cholesteric orientation or a chiral smectic C orientation wherein the helical axis direction in cholesteric phase or chiral smectic C phase is not uniformly parallel in a film thickness direction nor is the helix pitch uniformly equal in the film thickness direction, we have succeeded in obtaining a liquid crystalline film which functions suitably as a polarizing diffraction grating.

SUMMARY OF THE INVENTION

The present invention is firstly concerned with a light-diffusible cholesteric or chiral smectic C liquid crystalline film having a fixed cholesteric or chiral smectic C orientation in which the helical axis direction is not uniformly parallel in the film thickness direction.

The present invention is secondly concerned with a circular polarizer comprising the above liquid crystalline film.

The present invention is thirdly concerned with a linear polarizer formed by laminating the above liquid crystalline film and a quarter-wave sheet to each other.

The present invention is fourthly concerned with a liquid crystalline film having a fixed cholesteric or chiral smectic C orientation in which the helical axis direction is not uniformly parallel in the film thickness direction nor is the helix pitch uniformly equal in the film thickness direction.

MODE FOR CARRYING OUT THE INVENTION

The present invention will be described in detail hereinunder.

In connection with the cholesteric and chiral smectic C liquid crystalline films according to the present invention, reference will first be made below to the cholesteric liquid crystalline film as an example.

In the cholesteric liquid crystalline film according to the present invention, the helical axis direction is not uniformly parallel in the film thickness direction. In one example of such a cholesteric orientation, if the helical axis structure in the ordinary cholesteric orientation is regarded as a pseudo-layer structure, the liquid crystal molecules are cholesterically oriented in an irregularly curved or bent state of the said layer structure. Such a state is generally called a finger-print structure, provided the present invention is not limited thereto.

When a finger-print structure is formed, an oily streak is observed from the surface of the cholesteric liquid crystal layer.

As one mode of the cholesteric crystlalline film according to the present invention there is mentioned a film having such a finger-print structure as referred to above and having a layer with an oily streak formed therein.

A more detailed description will be given below about the said film.

In a cholesteric liquid crystalline film fabricating process according to the present invention, a cholesteric liquid crystalline polymer comprising a liquid crystalline polymer and a predetermined amount of an optically active compound, the liquid crystalline polymer exhibiting a nematic orientability of monodomain and capable of being easily fixed in the state of the said orientation, or a cholesteric liquid crystalline polymer exhibiting a uniform cholesteric orientability of monodomain and capable of being easily fixed in the state of the said orientation, is applied onto an orienting substrate, then dried and heat-treated, allowing a cholesteric orientation to be formed so as to have a finger-print structure and have a layer with an oily streak formed therein, followed by cooling to fix the cholesteric orientation without any damage thereto.

The cholesteric orientation having a finger-print structure and having an oily streak-formed layer, when observed in terms of liquid crystal phase series, is usually present between an ordinary cholesteric phase which forms a flat sheet structure and a liquid crystal transition point as a lower temperature portion thereof. The oily streak-formed layer has a distribution in the thickness direction of the cholesteric liquid crystal film such that the proportion thereof is usually small on the orienting substrate side and large on an air interface side. By utilizing such characteristics, more particularly, by using the air interface side of the film as a light incident surface, the diffusion efficiency of reflected light becomes large and there can be obtained such effects as light-diffusibility, non-specularity and wide visibility.

The following description is now provided about the cholesteric liquid crystalline polymer. As examples of this liquid crystalline polymer, mention may be made of those which exhibit a nematic or cholesteric liquid crystallinity, including main chain type liquid crystalline polymers such as polyesters, polyimides, polyamides, polycarbonates, and polyester-imides, as well as side chain type liquid crystalline polymers such as polyacrylates, polymethacrylates, polymalonates, and polysiloxanes. Above all, polyester type liquid crystalline polymers are preferred in view of easiness of synthesis, orientation and fixing, as well as transparency and glass transition points.

Reference will now be made to the optically active compound which is mixed with a nematic liquid crystalline polymer for imparting twist to the same polymer. Typical examples are optically active low-molecular compounds. Although any compounds are employable in the invention insofar as they are optically active, it is desirable to use an optically active liquid crystalline compound from the standpoint of compatibility with the liquid crystalline polymer. As further examples of optically active compounds are mentioned optically active high-molecular compounds. Although any high-molecular compounds are employable if only they possess an optically active group in the molecule, it is desirable to use a liquid crystalline, optically active high-molecular compound from the standpoint of compatibility with the nematic liquid crystalline polymer. Examples are such liquid crystalline polymers having an optically active group as polyacrylates, polymethacrylates, polymalonates, polysiloxanes, polyesters, polyamides, polyester amides, polycarbonates, polypeptides, and cellulose. Particularly, mainly aromatic, optically active polyesters are preferred in view of their compatibility with the nematic liquid crystalline polymer.

Thus, as the cholesteric liquid crystalline polymer for forming the cholesteric liquid crystalline film according to the present invention, it is desirable to use a composition comprising a nematic liquid crystlalline polyester and an optically active, low-molecular, liquid crystalline polymer, or a composition comprising a nematic liquid crystalline polyester and an optically active, liquid crystalline polyester. Even other than the compositions comprising nematic liquid crystalline polyesters and optically active compounds, there also may be preferably used cholesteric liquid crystalline polyesters having an optically active group in the main chain.

The cholesteric liquid crystalline film according to the present invention is formed by orienting any of the cholesteric liquid crystlalline polymers exemplified above onto an alignment film formed on a light transmitting substrate and by fixing the resulting orientation, and is usually employed in this state.

As examples of the light transmitting substrate are mentioned glass sheet, light transmitting plastic film, plastic sheet, and polarizing film. As glass there may be used, for example, soda glass, silica-coated soda glass, or borosilicate glass. As plastics of plastic substrates there may be used, for example, polymethyl methacrylates, polystyrenes, polycarbonates, polyether sulfones, polyphenylene sulfides, amorphous polyolefins, triacetyl cellulose, polyethylene terephthalates, and polyethylene naphthalates.

As the alignment film, a rubbed polyimide film is suitable, but there also may be used any of those publicly known in the field concerned. Plastic films or sheets which have been endowed with orientability by being rubbed directly without application of, for example, polyimide thereto are also employable as light transmitting substrates in the present invention. Any orienting process may be used insofar as it allows cholesteric liquid crystalline molecules to be oriented uniformly in parallel with the orientation interface.

Next, a cholesteric liquid crystalline polymer film having a suitable pitch length is formed on the alignment film thus formed on the light transmitting substrate so as to have a finger-print structure and have an oily streak-formed layer.

As means for applying a cholesteric liquid crystalline polymer onto the alignment film there may be adopted a melt application method or a solution application method, the latter being preferred from the standpoint of process.

In the solution application, the cholesteric liquid crystalline polymer is dissolved in a solvent at a predetermined proportion to prepare a solution having a predetermined concentration. The solvent differs depending on the type of the cholesteric liquid crystalline polymer used, but usually there may be used any of such halogenated hydrocarbons as chloroform, dichloroethane, tetrachloroethane, trichloroethylene, tetrachloroethylene, and o-dichlorobenzene, mixtures thereof with phenols, and polar solvents such as ketones, ethers, dimethylformamide, dimethylacetamide, dimethylsufloxide, N-methylpyrrolidone, sulfolane, and cyclohexane. As to the concentration of the solution, it cannot be said sweepingly because it differs depending on what type of a cholesteric liquid crystalline polymer is used, but usually it is in the range of 5 to 50 wt %, preferably 7 to 30 wt %. The solution is then applied onto an alignment film or onto a light transmitting substrate which has been subjected to an orienting treatment such as rubbing.

As the application method there may be adopted, for example, spin coating, roll coating, die coating, or curtain coating.

After the application of the solution, the solvent is removed by drying, followed by heat treatment at a predetermined temperature for a predetermined period of time to complete a cholesteric orientation having an oily streak-formed layer. By cooling the cholesteric orientation to a temperature below the glass transition point of the cholesteric liquid crystalline polymer, the orientation can be fixed without damage thereto.

The cholesteric liquid crystalline film thus formed exhibits a selective reflection phenomenon according to the pitch length upon exposure to light in the infrared, visible, or ultraviolet region. Further, the film is less dependent on the viewing angle and is superior in visibility while a specular reflection is suppressed by the finger-print structure and oily streak formed in the interior of the cholesteric liquid crystal layer.

The application range of the cholesteric liquid crystalline film and the chiral smectic C liquid crystalline film thus prepared according to the present invention and having the above characteristics is extremely wide. For example, they can be used as various optical elements, including polarizing sheets, opto-electronic elements, and materials for ornamental use. As typical and concrete uses are mentioned uses as an optical element which exhibits a selective reflection phenomenon to afford a specific wavelength, an optical filter which cuts off light of a specific wavelength, a circular polarizer, and a linear polarizer combined with a quarter-wave sheet. But these are mere examples.

Particularly, for a use in which specular reflection is not desirable or for a use in which a wide visibility is required, the cholesteric liquid crystalline film or chiral smectic C liquid crystalline film according to the present invention affords an extremely outstanding effect of improvement in comparison with the conventional like films.

Now, description will be directed below to a novel liquid crystalline film capable of generating a diffracted light having polarizability according to the present invention.

In this liquid crystalline film according to the present invention, the helical axis direction is not uniformly parallel to the film thickness direction nor is the helix pitch uniformly equal in the film thickness direction. As an example of such a liquid crystalline film, mention may be made of one having an orientation such that when the helical axis structure in an ordinary cholesteric or chiral smectic C orientation is regarded as a pseudo-layer structure, this layer structure is irregularly curved or bent. The present invention is not limited to such a structure, nor is placed any special limitation on the means for forming such a structure.

As an example of a process for fabricating the liquid crystalline film having such a unique liquid crystal phase structure there is mentioned a process wherein the foregoing liquid crystalline film with fixed cholesteric or chiral smectic C orientaiton having a helical axis uniformly parallel to the film thickness direction and having a uniformly equal helix pitch is formed and thereafter a desired diffraction pattern is transferred to the film. For the pattern transfer there may be adopted, for example, a method wherein a form having a diffraction pattern is provided and is transferred to the film mechanically. In this case, it is not that concaves and convexes of the diffraction pattern are transferred to only the film surface, but it is important for the liquid crystal structure in the interior of the film to be deformed in such a manner that the helical axis is not uniformly parallel in the film thickness direction nor is the helix pitch uniformly equal in the film thickness direction. This desired deformation in the interior of the film may be effected by transferring the diffraction pattern to the film under heating.

The transfer of the diffraction pattern may be carried out by a mechanical method involving using a form having the diffraction pattern, making the diffraction pattern side of the form and the surface of the cholesteric or chiral smectic C liquid crystal layer come closely into contact with each other, and allowing the pattern to be transferred to the film under specific heating and pressurizing conditions.

As the form having the diffraction pattern, no special limitation is placed thereon insofar as the form used is not likely to damage the pattern under heating and pressurizing conditions during the transfer. For example, there may be used a diffraction grating having a grating shape formed on an aluminum or polymer layer which is coated onto a substrate such as a glass or metallic sheet or a polymer film. As the form having the diffraction pattern there also may be used a commercially available one such as, for example, a commercial grade ruled diffraction grating manufactured by Edmund Scientific Co., a transmission type diffraction grating film, or a ruled grating manufactured by JOBIN YVON Co., provided no limitation is made thereto.

The "mechanical" method as referred to herein indicates the use of a molding and pressurizing apparatus such as a press, rolling mill, calender roll, laminator, or stamper.

The film and the form having the diffraction pattern are fed to the above apparatus in a closely contacted state of the diffraction pattern side of the form with the cholesteric or chiral smectic C layer surface and are held under predetermined heating and pressurizing conditions for a predetermined certain period of time. Thereafter, the temperature is reduced for cooling to below the glass transition temperature of the liquid crystalline polymer used and then the form having the diffraction grating is released from the cholesteric or chiral smectic C liquid crystal layer, whereby the liquid crystalline film having such a unique liquid crystal structure as described above according to the present invention can be fabricated.

The above heating condition is usually set to a temperature range above the glass transition point of the liquid crystalline polymer used and below the temperature at which an isotropic phase appears. A concrete heating temperature range cannot be said sweepingly because it differs depending on the type of apparatus and liquid crystal used, the form of film, and the material of a diffraction pattern form used, but is usually in the range of 50° to 300° C., preferably 60° to 250° C., more preferably 70° to 200° C., and most preferably 90° to 180° C.

As the above pressurizing condition there is adopted a pressure range not impairing the shape of the liquid crystal layer and of the form having the diffraction pattern. A concrete pressure range differs depending on the type of apparatus and liquid crystal used, the form of film, and the material of the form having the diffraction pattern, so cannot be said sweepingly, but is usually in the range of 0.3 to 500 $kgf/cm^2$, preferably 0.5 to 400 $kgf/cm^2$, more preferably 1 to 300 $kgf/cm^2$, and most preferably 2 to 200 $kgf/cm^2$.

Further, the period of time for holding the cholesteric or chiral smectic C liquid crystal layer under the above heating and pressurizing conditions differs depending on the type of apparatus and cholesteric liquid crystal used, the shape of film, and the material of the form having the diffraction pattern, so cannot be said sweepingly, but is usually not shorter than 0.01 seconds, preferably 0.05 second to 30 minutes, more preferably 0.1 second to 15 minutes.

As the liquid crystalline polymer there may be used, as noted previously, a cholesteric or chiral smectic C liquid crystalline polymer comprising a liquid crystalline polymer and a predetermined amount of an optically active compound, the said liquid crystalline polymer exhibiting a uniform nematic or smectic C orientability of monodomain on an orienting substrate and capable of being easily fixed in the so-oriented state, or a cholesteric or chiral smectic C liquid crystalline polymer exhibiting a uniform cholesteric or chiral smectic C orientability of monodomain and capable of being easily fixed in the so-oriented state.

By fixing the cholesteric or chiral smectic C orientation in which the helical axis is uniformly parallel in the film thickness direction and the helix pitch is uniformly equal in the film thickness direction, without impairing the orientation, in the manner described above, and by subsequently transferring the diffraction pattern to the resulting liquid crystalline polymer film by the control method previously described, there can be obtained the liquid crystalline film according to the present invention.

As an example of a method for fabricating the liquid crystalline film according to the present invention there is mentioned a method involving transferring a desired diffraction pattern beforehand onto such an orienting substrate as described above, or using a form itself having a desired diffraction pattern as an orienting substrate, applying a liquid crystalline polymer onto the substrate, performing a heat treatment at a predetermined temperature for a predetermined period of time, and subsequent cooling.

The above method is only an example and the liquid crystalline film according to the present invention is not limited by the manufacturing method.

On the liquid crystalline polymer side of the liquid crystalline film thus formed there may be formed an overcoating layer for protecting the liquid crystal surface. The overcoating layer is not specially limited. For example, there may be used an adhesive which exhibits isotropy optically after curing. In case of using such an adhesive, an overcoating layer can be formed by bonding the liquid crystal side of the liquid crystalline film to a substrate having removability through the adhesive and by removing the removable substrate after curing of the adhesive.

The removable substrate is not specially limited insofar as it possesses removability and a self-supporting property. As the said substrate, a plastic film having releasability is usually preferred. The "removability" as referred to herein means that the removable substrate can be removed at the interface with the adhesive in a mutually bonded state of the liquid crystalline film and the removable substrate through the adhesive.

The adhesive is not specially limited if only it can bond the liquid crystalline polymer side and the removable substrate with each other and permits removable of the substrate. As examples of the adhesive, if classified according to curing means, are mentioned photocuring type, electron beam curing type, and heat-curing type adhesives. Particularly preferred are acrylic oligomer-based photocuring type and electron beam curing type adhesives, as well as epoxy resin-based photocuring type and electron beam curing type adhesives. As to in what form the liquid crystalline film and the removable substrate are to be bonded together, no special limitation is imposed thereon. But usually an adhesive layer is disposed between the liquid crystalline film and the substrate. The thickness of the adhesive layer is not specially limited, but is usually in the range of 1 to 30 $\mu$m. Various additives, such as antioxidant and ultraviolet absorber, may be incorporated in the adhesive insofar as they do not impair the effect of the present invention.

In the liquid crystalline film both diffraction characteristic and polarization characteristic are developed by the layer structure of the liquid crystal molecules present in the interior of the film, so by disposing an adhesive free of any difference in refractive index the film can be laminated to another optical element without impairing its diffraction characteristic and polarization characteristic.

The liquid crystalline film obtained according to the present invention exhibits a selective reflection phenomenon proportional to the helix pitch length against light in the infrared, visible, or ultraviolet region. At the same time, a diffraction phenomenon is developed by the diffraction pattern formed in the interior of the liquid crystal layer, and the diffracted light possesses a circular polarizability. The liquid crystalline film has such unique features not found in the conventional liquid crystalline polymer film. In this liquid crystalline film, moreover, since both diffraction characteristic and polarization characteristic are developed by the layer structure of the liquid crystal molecules in the interior of the film, such diffraction and polarization characteristics of the film are not impaired even if the film is laminated to another optical element through, for example, an adhesive free of any difference in refractive index.

The application range of the liquid crystalline film according to the present invention, which has such unique optical characteristics as referred to above, is extremely wide. For example, it is employable as any of various optical elements, including a polarizing sheet, opto-electronic elements, and ornamental materials. As typical and concrete examples of uses are mentioned uses as an optical device which requires a spectrally split polarized light, a polarizing optical element or an optical filter, which utilizes a diffraction phenomenon to obtain a specific wavelength, a circular polarizer, and a linear polarizer obtained by combining the film with a quarter-wave sheet. But these are mere examples.

Particularly in the use requiring a spectrally split polarized light the liquid crystalline film according to the present invention exhibits an extremely outstanding effect of improvement in comparison with the conventional combination of a diffraction grating and a polarizer.

EXAMPLES

The following examples are given, but it is to be understood that the liquid crystalline film according to the present invention is not limited thereto.

Example 1

A liquid crystalline polyester composition of the following composition formula having a glass transition temperature of 80° C. and having an R-isomer optical activity was formed into film on a triacetyl cellulose film having a rubbed polyimide layer by means of a spin coating method, followed by heat treatment at 135° C. for 5 minutes. The thus formed exhibited a non-specular reflection of green color. From observation using a polarizing microscope and TEM observation in a cross section of the film it turned out that there was obtained an orientation having a finger-print structure and forming an oily streak in which the helical axis direction in cholesteric phase was not uniformly parallel to the film thickness direction. The film was then measured for transmission spectrum using a spectrophotometer for ultraviolet, visible and near infrared region, V-570 (a product of Nippon Bunko Co.), to find that there was formed a cholesteric liquid crystal layer exhibiting a selective reflection with a selective reflection wavelength band width Δλ of about 90 nm at a central wavelength λs of about 550 nm.

Example 2

A liquid crystalline polyester composition of the following composition formula having a glass transition temperature of 77° C. and having an R-isomer optical activity was formed into film on a triacetyl cellulose film having a rubbed polyimide layer by means of a spin coating method, followed by heat treatment at 130° C. for 5 minutes. The film thus formed exhibited a non-specular reflection of blue color. From observation using a polarizing microscope and TEM observation in a cross section of the film it turned out that there was obtained an orientation having a finger-print structure and forming an oily streak in which the helical axis direction in cholesteric phase was not uniformly parallel to the film thickness direction. The film was then measured for transmission spectrum using a spectrophotometer for ultraviolet, visible and near infrared region, V-570 (a product of Nippon Bunko Co.), to find that there was formed a cholesteric liquid crystal layer exhibiting a selective reflection with a selective reflection wavelength band width Δλ of about 90 nm at a central wavelength λs of about 500 nm.

Example 3

A liquid crystalline polyester composition of the following composition formula having a glass transition temperature of 77° C. and having an R-isomer optical activity was formed into film on a triacetyl cellulose film having a rubbed polyimide layer by means of a spin coating method, followed by heat treatment at 130° C. for 5 minutes. The film thus formed exhibited a non-specular reflection of red color. From observation using polarizing microscope and TEM observation in a cross section of the film it turned out that there was obtained an orientation having a finger-print structure and forming an oily streak in which the helical axis direction in cholesteric phase was not uniformly parallel to the film thickness direction. The film was then measured for transmission spectrum using a spectrophotometer for ultraviolet, visible and near infrared region, V-570 (a product of Nippon Bunko Co.), to find that there was formed a cholesteric liquid crystal layer exhibiting a selective reflection with a selective reflection wavelength band width Δλ of about 110 nm at a central wavelength λs of about 620 nm.

Comparative Example 1

A liquid crystalline polyester composition of the following composition formula having a glass transition temperature of 80° C. and having an R-isomer optical activity was formed into film on a triacetyl cellulose film having a rubbed polyimide layer by means of a spin coating method, followed by heat treatment at 150° C. for 10 minutes. The film thus formed was a monodomain film exhibiting a specular reflection of green color. From observation using a polarizing microscope and TEM observation in a cross section of the film there could be confirmed a uniform helix pitch of a cholesteric liquid crystal layer. The film was then measured for transmission spectrum using a spectrophotometer for ultraviolet, visible and near infrared region, V-570 (a product of Nippon Bunko Co.), to find that there was formed a cholesteric liquid crystal layer exhibiting a selective reflection with a selective reflection wavelength band width $\Delta\lambda$ of about 90 nm at a central wavelength $\lambda s$ of about 550 nm.

Comparative Example 2

A liquid crystalline polyester composition of the following composition formula having a glass transition temperature of 77° C. and having an S-isomer optical activity was formed into film on a triacetyl cellulose by a spin coating method, followed by heat treatment at 145° C. for 10 minutes. The film thus formed was a monodomain film exhibiting a specular reflection of yellow color. From observation using a polarizing microscope and TEM observation in a cross section of the film there could be confirmed a uniform helix pitch of a cholesteric liquid crystal layer. The film was then measured for transmission spectrum using a spectrophotometer for ultraviolet, visible and near infrared region, V-570 (a product of Nippon Bunko Co.), to find that there was formed a cholesteric liquid crystal layer exhibiting a selective reflection with a selective reflection wavelength band width $\Delta\lambda$ of about 110 nm at a central wavelength $\lambda s$ of about 590 nm.

Example 4

Figure 1:
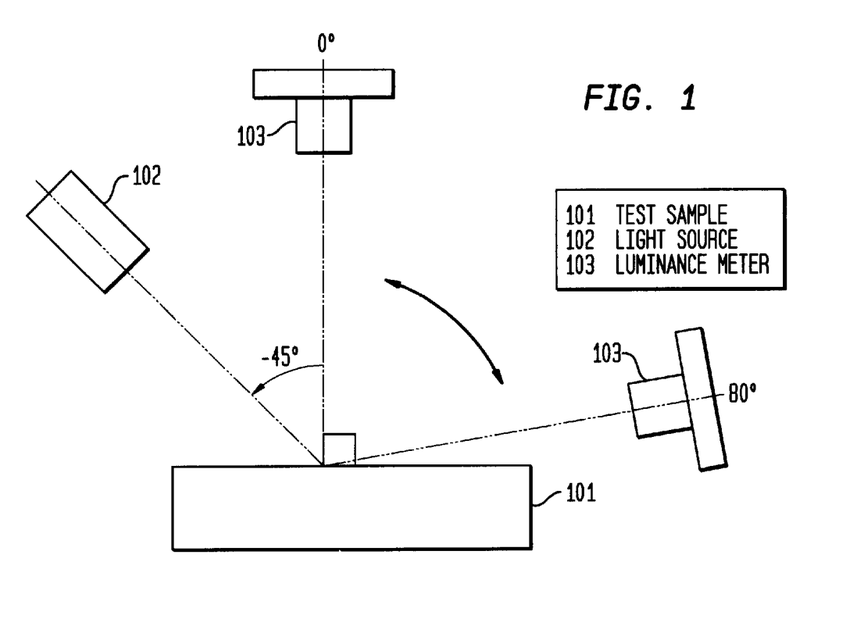
FIG. 1 is a schematic diagram showing the configuration of the optical measurement system described in Example 4.
Figure 2:
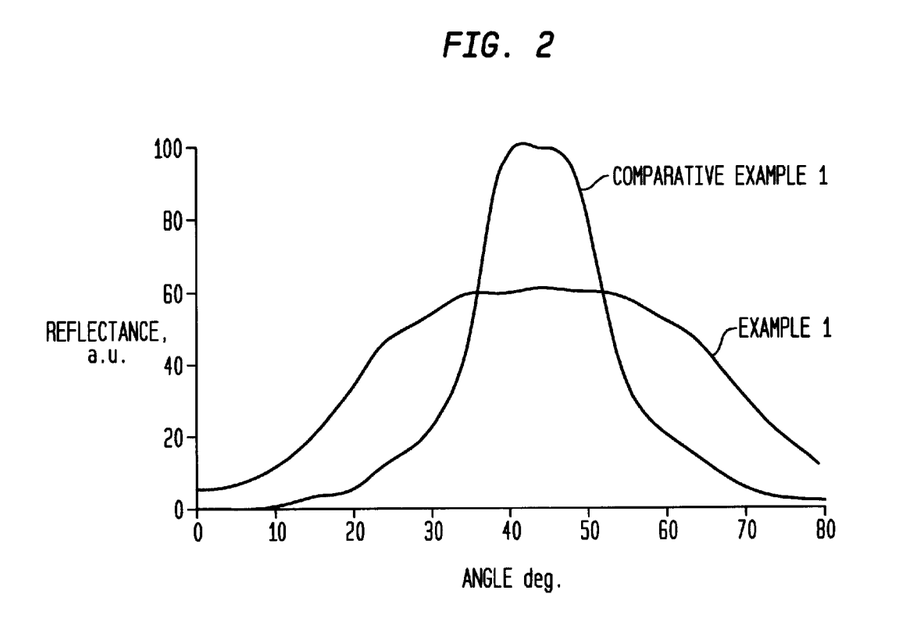
FIG. 2 is a diagram showing the reflectance measurement results described in Example 4.

For checking the suppression of specular reflection and the effect of diffusion there was conducted an optical measurement using such an optical system as FIG. 1 installed in a dark room. A normal line direction of a test sample surface was set at 0 degrees and the test sample was illuminated with a light source fixed at a −45° position. In this test, light emitted from a halogen light source is conducted through an optical fiber to a collimating lens attached to a tip end of the optical fiber, and the resulting collimated light beam was used for the illumination. Using a color luminance meter BM-7 (a product of Topcon Co.), reflection luminance values were measured in increments of 5° from 0° to 80°. Both cholesteric liquid crystalline film obtained in Comparative Example 1 and exhibiting a specular reflection and the cholesteric liquid crystalline film obtained in Example 1 were used as test samples. With respect to each of the test samples there was measured a reflection angle dependence of reflection luminance, the results of which are shown in FIG. 2.

In case of the film obtained in Comparative Example 1 and exhibiting a specular reflection, a light source image was reflected in the sample surface at +45° at which there occurred a specular reflection. At angles other than 45° there occurred a rapid deterioration of luminance and the visibility was poor. In contrast therewith, in case of the cholesteric liquid crystalline film obtained in Example 1, the angle dependence of reflection luminance was small, a sufficient reflected light could be observed even at an angle other than 45°, a light source image was less reflected in the film surface at the specular reflection angle, and the visibility was good.

Example 5

The cholesteric liquid crystalline film obtained in Example 2 was measured for the degree of circular polarization by means of an automatic ellipsometer DVA036VW (a product of Mizojiri Kogaku Kogyo-Sho). The difference in transmittance between left and right circularly polarized lights at the wavelength of 500 nm was equal to 1:22.3, thus showing that the right circularly polarized light was higher in transmittance. Thus, it turned out that this cholesteric liquid crystalline film transmitted the right circularly polarized light with a polarization degree of about 91% and was employable as a circular polarizer which reflects the left circularly polarized light. Under an ordinary interior lighting, the cholesteric film was visually compared with the cholesteric liquid crystalline film obtained in Comparative Example 1 and exhibiting a specular reflection. As a result, it turned out that in case of the cholesteric liquid crystalline film obtained in Example 2, an extraneous light was less reflected in the film surface, and that the film was employable as a circular polarizer with less reflection of an extraneous light in the film surface.

Example 6

A uniaxially stretched film (a product of Polatechno Co., formed of a polyvinyl alcohol, retardation: 140 nm) was laminated as a quarter-wave sheet onto the cholesteric liquid crystalline film obtained in Example 1 through an adhesive to afford a linear polarizer. For determining the degree of polarization of the linear polarizer, transmittances at 550 nm were measured by a spectroscope PMA-11 (a product of Hamamatsu Photonics Co.) while the angle between an absorption axis of a polarizer known as Glan-Thompson prism and a retardation axis of the quarter-wave sheet in the linear polarizer was at +45° and −45°. The ratio of the transmittance at +45° to the transmittance at −45° was 1:31.5. Thus, the polarization degree of the linear polarizer in question was fund to be about 93.8%. This cholesteric film was compared with a linear polarizer visually and outdoors under the sunlight, which linear polarizer had been prepared by laminating a uniaxially stretched film (a product of Polatechno Co., formed of a polyvinyl alcohol, retardation: 140 nm) to the cholesteric liquid crystalline film obtained in Comparative Example 2 through an adhesive, to find that in case of the cholesteric liquid crystalline film obtained in Example 1, an extraneous light was less reflected in the film surface. Thus, the cholesteric liquid crystalline film obtained in Example 1 proved to be employable as a linear polarizer with less reflection of an extraneous light in the film surface.

Example 7

A liquid crystalline polyester composition of the following composition formula having a glass transition temperature of 80° C. and an R-isomer optical activity was formed into film on a triacetyl cellulose film having a rubbed polyimidelayer by a spin coating method, followed by heat treatment at 160° C. for 3 minutes. The film thus formed exhibited a non-specular reflection of red color. From observation using a polarizing microscope and TEM observation in a cross section of the film it turned out that there was obtained an orientation having a finger-print structure and forming an oily streak in which the helical axis direction in cholesteric phase was not uniformly parallel to the film thickness direction. The film was measured for transmission spectrum by means of a spectrophotometer for ultraviolet, visible and near infrared region, V-570 (a product of Nippon Bunko Co.), to find that there was formed a cholesteric liquid crystal layer exhibiting a selective reflection with a selective reflection wavelength band width Δλ of about 110 nm at a central wavelength λs of about 660 nm.

Example 8

A composition of liquid crystalline polyesters (polymers A and B) of the following composition formulas, (a composition prepared by mixing polymers A and B in a weight ratio of 75:25), having a glass transition temperature of 90° C. and having an S-isomer optical activity was formed into film on a triacetyl cellulose film having a rubbed polyimide layer by a spin coating method, followed by heat treatment at 180° C. for 5 minutes. The film thus formed exhibited a non-specular reflection of green color. From observation using a polarizing microscope and TEM observation in a cross section of the film it turned out that there was obtained an orientation having a finger-print structure and forming an oily streak in which the helical axis direction in cholesteric phase was not uniformly parallel to the film thickness direction. The film was measured for transmission spectrum using a spectrophotometer for ultraviolet, visible and near infrared region, V-570 (a product of Nippon Bunko Co.) to find that there was formed a cholesteric liquid crystal layer exhibiting a selective reflection with a selective reflection wavelength band width Δλ of about 90 nm at a central wavelength λs of about 540 nm.

Polymer A

-continued

Polymer B

Reference Example 1

A liquid crystalline polyester composition of the following composition formula having a glass transition temperature of 77° C. and having an R-isomer optical activity was formed into film on a triacetyl cellulose film having a rubbed polyimide layer by a spin coating method. The film thus formed exhibited a specular reflection of blue color. Form observation using a polarizing microscope and TEM observation in a cross section of the film it turned out that the helical axis direction in a chiral smectic C phase was uniformly parallel to the film thickness direction and that the helix pitch was also uniformly equal in the film thickness direction. The film was measured for transmission spectrum by means of a spectrophotometer for ultraviolet, visible and near infrared regions, V-570 (a product of Nippon Bunko Co.). As a result, there was confirmed a selective reflection with a selective reflection wavelength band width Δλ of about 90 nm at a central wavelength λs of about 500 nm. Further, when the sample was tilted 30° and measured for transmission spectrum, there was confirmed a selective reflection corresponding to a full pitch band at a central wavelength λs of about 920 nm, thus proving the formation of a chiral smectic C liquid crystal phase.

Example 9

A ruled diffraction grating film (900 lines/mm) (a product of Edmund Scientific Japan Co.) and the cholesteric liquid crystalline film formed in Example 1 were put one on the other so that the diffraction surface of the diffraction grating film and the liquid crystalline polymer surface of the cholesteric liquid crystalline film were opposed to each other, and were then pressed on a hot plate heated to about 100° C. at a pressure of about 15 kg/cm² using a rubber roller. Then, the ruled diffraction grating film was removed and an overcoating layer (thickness: about 5 μm) was formed on the liquid crystalline polymer surface with use of an acrylic overcoating agent (refractive index: 1.53) to level the resulting unevenness of the liquid crystalline polymer surface. From observation using a polarizing microscope and TEM observation in a cross section of the film it turned out that there was obtained a cholesteric orientation with the helical axis direction in cholesteric phase being not uniformly parallel to the film thickness direction and the helix pitch being not uniformly equal in the film thickness direction.

When He—Ne laser beam (wavelength: 632.8 nm) was radiated perpendicularly into the surface of the liquid crystalline film thus formed, the laser beam was observed at each of exit angles 0° and about ±35°. Thus, it turned out that an area functioning as a diffraction grating was formed in the interior of the liquid crystalline film.

Next, to check polarization characteristics, the liquid crystalline film was placed under an ordinary interior lighting and was observed through a right-hand circular polarizer, which transmits only a right-hand circularly polarized light. As a result, a reflected diffraction light of rainbow color was observed and the brightness was about the same as in observation made without using the polarizer. On the other hand, when observation was made through a left-hand circular polarizer, which transmits only a left-hand circularly polarized light, a dark field resulted and a reflected diffraction light of rainbow color was not observed. Thus, a diffracted light of the liquid crystalline film proved to be the right-hand circularly polarized light.

Now it turned out that a diffracted light of the right-hand circularly polarized light was obtained by the liquid crystalline film.

Example 10

A ruled diffraction grating film (900 lines/mm) (a product of Edmund Scientific Japan Co.) and the chiral smectic C liquid crystalline film obtained in Reference Example 1 were put one on the other so that a diffraction surface of the diffraction grating film and the liquid crystalline polymer surface of the chiral smectic C liquid crystalline film were opposed to each other, and were then pressed on a hot plate heated to about 90° C. at a pressure of about 20 kg/cm² using a rubber roll. Next, the ruled diffraction grating film was removed and an overcoating layer (thickness: about 5 μm) was formed on the liquid crystalline polymer surface with use of an acrylic overcoating agent (refractive index: 1.53) to level the resulting unevenness of the liquid crystalline polymer surface. From observation using a polarizing microscope and TEM observation in a cross section of the film, the liquid crystalline film after the removal of the ruled diffraction grating film was found to have a chiral smectic C orientation in which the helical axis direction in chiral smectic C liquid crystal phase was not uniformly parallel to the film thickness direction nor was the helix pitch uniformly equal in the film thickness direction.

When He—Ne laser beam (wavelength: 632.8 nm) was radiated perpendicularly into the surface of the liquid crystalline film thus formed, the laser beam was observed at each of exit angles 0° and about ±35°. Thus, the liquid crystalline film proved to function as a diffraction grating. It turned out that an area functioning as a diffraction grating was formed in the interior of the liquid crystalline film.

Next, to check polarization characteristics, the liquid crystalline film was placed under an ordinary interior lighting and was observed through a right-hand circular polarizer, which transmits only a right-hand circularly polarized light. As a result, a reflected diffraction light of rainbow color was observed and the brightness was about the same as in observation made without using the polarizer. On the other hand, when observation was made using a left-hand circular polarizer, which transmits only a left-hand circularly polarized light, a dark field resulted and a reflected diffraction light of rainbow color was not observed. Thus, a diffracted light of the liquid crystalline film proved to be the right-hand circularly polarized light.

Now, it turned out that a diffracted light of the right-hand circularly polarized light was obtained from the liquid crystalline film prepared as above.

Example 11

A uniaxially stretched film (a product of Polatechno Co., formed of a polyvinyl alcohol, retardation: 140 nm) was laminated as a quarter-wave sheet onto the liquid crystalline film obtained in Example 10 through an acrylic adhesive to afford a laminate.

Then, a polarizing sheet HLC2-5518 (a product of Sanrittsu Co.) was superimposed on the quarter-wave sheet side of the laminate and observation was made to find that there was a dark field at an angle of 45° between a slow axis of the quarter-wave sheet and an absorption axis of the polarizing sheet. Further, at an angle of 45° between the slow axis of the quarter-wave sheet and a transmission axis of the polarizing sheet there was obtained a bright field and a selectively reflected light in green color of the liquid crystalline film was observed. When a halogen light was radiated, there was observed a diffracted light of rainbow color.

Thus, it turned out that the diffracted light obtained when using the laminate of the liquid crystalline film of Example 11 and the quarter-wave sheet was a linearly polarized light and that the said laminate exhibited a function as a linearly polarized light diffraction grating.

Reference Example 2

A liquid crystalline polyester composition containing an R-isomer optical active compound and having a glass transition temperature of 120° C. was formed into film on a triacetate film having a rubbed polyimide layer by a spin coating method, followed by heat treatment at 150° C. for 5 minutes. The film thus formed exhibited a specular reflection of gold color. From observation using a polarizing microscope and TEM observation in a cross section of the film it turned out that the helical axis in cholesteric phase was uniformly parallel to the film thickness direction and that the helix pitch was also uniformly equal in the film thickness direction. The film was then measured for transmission spectrum by means of a spectrophotometer for ultraviolet, visible and near infrared region, V-570 (a product of Nippon Bunko Co.), to find that there was formed a cholesteric liquid crystal layer exhibiting a selective reflection with a selective reflection wavelength band width $\Delta\lambda$ of about 100 nm at a central wavelength $\lambda s$ of about 600 nm.

Reference Example 3

A acrylic cholesteric liquid crystalline compound having an R-isomer optical activity was formed into film on a polyethylene naphthalate film having a rubbed polyimide layer by a spin coating method, followed by heat treatment at 140° C. for 5 minutes. The film thus formed exhibited a specular reflection of gold color. Then, an ultraviolet light was radiated to the film in a nitrogen atmosphere, allowing the film to undergo crosslinking. As a result, the film was found to retain a cholesteric orientation with a glass transition temperature of 150° C. Form observation using a polarizing microscope and TEM observation it turned out that the helical axis direction in cholesteric phase was uniformly parallel to the film thickness direction and that the helix pitch was also uniformly equal in the film thickness direction. The film was then measured for transmission spectrum by means of a spectrophotometer for ultraviolet, visible and near infrared region, V-570 (a product of Nippon Bunko Co.), to find that there was formed a cholesteric liquid crystal layer exhibiting a central reflection with a selective reflection wavelength band width $\Delta\lambda$ of about 100 nm at a central wavelength $\lambda s$ of about 610 nm.

Comparative Example 3

A ruled diffraction grating film (900 lines/mm) (a product of Edmund Scientific Japan Co.) and the cholesteric liquid crystalline film obtained in Comparative Example 2 were put one on the other so that a diffraction surface of the diffraction grating film and the liquid crystalline polymer surface of the cholesteric liquid crystalline film were opposed to each other, then were put on a plate of a 26-ton press (a product of Shinei Sangyo Co.), followed by the application of heat and pressure for 5 minutes under the conditions of a temperature below the glass transition point of the liquid crystalline polymer used in Reference Example 1 and 100 kg/cm$^2$. The thus-pressed laminate was taken out from the press and cooled to room temperature. Thereafter, the ruled diffraction grating film was removed to find that the diffraction pattern was not transferred to the cholesteric liquid crystalline polymer layer. The film after the removal of the ruled diffraction grating film was subjected to observation using a polarizing microscope and TEM observation for a cross section of the film to find that there was no change in the cholesteric orientation, with the helical axis in cholesteric phase being uniformly parallel to the film thickness direction and the helix pitch being uniformly equal in the film thickness direction.

Comparative Example 4

A ruled diffraction grating film (900 lines/mm) (a product of Edmond Scientific Japan Co.) and the cholesteric liquid crystalline film obtained in Comparative Example 2 were put one on the other so that a diffraction surface of the diffraction grating film and the liquid crystalline polymer surface of the cholesteric liquid crystalline film were opposed to each other, then were put on a plate of a 26-ton press (a product of Shinei Sangyo Co.), followed by the application of heat and pressure for 5 minutes under the conditions of a temperature above an isotropic phase transition temperature of the liquid crystalline polymer and 100 kg/cm$^2$. The thus-pressed laminate was taken out and cooled to room temperature. Thereafter, the ruled diffraction grating film was removed to find that the cholesteric orientation underwent a change to an isotropic phase present in a higher temperature zone than the cholesteric liquid crystal phase and that the cholesteric orientation was not retained.

Example 13

A ruled diffraction grating film (900 lines/mm) (a product of Edmund Scientific Japan Co.) and the cholesteric liquid crystalline film obtained in Reference Example 2 were put one on the other so that a diffraction surface of the diffraction grating film and the liquid crystalline polymer surface of the cholesteric liquid crystalline film were opposed to each other, followed by the application of heat and pressure under the conditions of 135° C., 3 kg/cm$^2$, and a roll contact time of 0.5 second, using a laminator DX-350 (a product of Tokyo Laminex Co.). After subsequent cooling to room temperature, the ruled diffraction grating film was removed, leaving the liquid crystalline film with the diffraction pattern transferred to the cholesteric liquid crystalline polymer layer. Then, an overcoating layer (thickness: about 5 $\mu$m) was formed on the liquid crystalline polymer surface with use of an acrylic overcoating agent (refractive index: 1.53)

to level the resulting unevenness of the liquid crystalline polymer surface.

The liquid crystalline film was then subjected to observation using a polarizing microscope and TEM observation for a cross section of the film to find that there was formed a cholesteric orientation in which the helical axis direction was not uniformly parallel to the film thickness direction nor was the helix pitch uniformly equal in the film thickness direction.

When He—Ne laser beam (wavelength: 632.8 nm) was radiated perpendicularly into the film surface, the laser beam was observed at each of exit angles 0° and about ±35°. Thus, it turned out that an area functioning as a diffraction grating was formed in the interior of the cholesteric liquid crystalline film.

Then, to check polarization characteristics, the liquid crystalline film was placed under an ordinary interior lighting and was observed through a right-hand circular polarizer, which transmits only a right-hand circularly polarized light. As a result, a reflected diffraction light of rainbow color was observed and the brightness was about the same as in observation made without using the polarizer. On the other hand, when observation was made through a left-hand circular polarizer, which transmits only a left-hand circularly polarized light, a dark field resulted and a reflected diffraction light of rainbow color was not observed. Thus, a diffracted light of the liquid crystalline film proved to be the right-hand circularly polarized light.

Comparative Example 5

A ruled diffraction grating film (900 lines/mm) (a product of Edmond Scientific Japan Co.) and the cholesteric liquid crystalline film obtained in Reference Example 2 were put one on the other so that a diffraction surface of the diffraction grating film and the liquid crystalline polymer surface of the cholesteric liquid crystalline film were opposed to each other, followed by the application of heat and pressure under the conditions of 135° C., 0.2 kg/cm², and a roll contact time of 0.5 second, using a laminator DX-350 (a product of Tokyo Laminex Co.). After subsequent cooling to room temperature, the ruled diffraction grating film was removed, leaving the liquid crystalline film with the diffraction pattern transferred slightly to the cholesteric liquid crystalline polymer layer. Then, an overcoating layer (thickness: about 5 μm) was formed on the liquid crystalline polymer surface with use of an acrylic overcoating agent (refractive index: 1.53) to level the resulting unevenness of the liquid crystalline polymer surface. As a result, the diffraction pattern became invisible. From observation using a polarizing microscope and TEM observation in a cross section of the film it turned out that there was no change in the cholesteric orientation, with the helical axis direction in cholesteric phase being uniformly parallel to the film thickness direction and the helix pitch being uniformly equal in the film thickness direction.

Example 14

A ruled diffraction grating film (900 lines/mm) (a product of Edmond Scientific Japan Co.) and the cholesteric liquid crystalline film obtained in Reference Example 3 were put one on the other so that a diffraction surface of the diffraction grating film and the liquid crystalline polymer surface of the cholesteric liquid crystalline film were opposed to each other, followed by the application of heat and pressure under the conditions of 170° C., 20 kg/cm², and a roll contact time of 1 second, using a rolling mill (a product of Hitachi Kikai Engineering Co.). After subsequent cooling to room temperature, the ruled diffraction grating film was removed, leaving the liquid crystalline film with the diffraction pattern transferred to the cholesteric liquid crystalline polymer layer. Then, an overcoating layer (thickness: about 5 μm) was formed on the liquid crystalline polymer surface with use of an acrylic overcoating agent (refractive index: 1.53) to level the unevenness of the liquid crystalline polymer surface.

The liquid crystalline film was then subjected to observation using a polarizing microscope and TEM observation for a cross section of the film to find that there was formed a cholesteric orientation in which the helical axis direction in cholesteric phase was not uniformly parallel to the film thickness direction nor was the helix pitch uniformly equal in the film thickness direction.

When He—Ne laser beam (wavelength: 632.8 nm) was radiated perpendicularly into the surface of the liquid crystalline film, the laser beam was observed at each of exit angles 0° and about ±35°. Thus, it turned out that an area functioning as a diffraction grating was formed in the interior of the liquid crystalline film.

Next, to check polarization characteristics, the liquid crystalline film was placed under an ordinary interior lighting and was observed through a right-hand circular polarizer, which transmits only a right-hand circularly polarized light. As a result, a reflected diffraction light of rainbow color was observed and the brightness was about the same as in observation made without using the polarizer. On the other hand, when observation was made through a left-hand circular polarizer, which transmits only a left-hand circularly polarized light, a dark field resulted and a reflected diffraction light of ranbow color was not observed. Thus, a diffracted light of the liquid crystalline film proved to be the right-hand circularly polarized light.

What is claimed is:

1. A liquid crystalline film having a fixed cholesteric or chiral smectic C orientation in which the helical axis direction is not uniformly parallel to the film thickness direction.

2. A liquid crystalline film having a fixed cholesteric or chiral smectic C orientation in which the helical axis direction is not uniformly parallel to the film thickness direction nor is the helix pitch uniformly equal in the film thickness direction.

3. A process for fabricating the film of claim 1, characterized by transferring a diffraction pattern to a cholesteric or chiral smectic C liquid crystal layer.

4. The process of claim 3, wherein the cholesteric or chiral smectic C liquid crystal layer is formed using a liquid crystalline polymer.

5. The process of claim 4, wherein the diffraction pattern is transferred to the cholesteric or chiral smectic C liquid crystal layer in a temperature range of above a glass transition point of the liquid crystalline polymer and below an isotropic phase transition temperature of the liquid crystalline polymer and in a pressure range of 0.3 to 500 kgf/cm².

6. A light-diffusible film comprising the liquid crystalline film of claim 1.

7. A circular polarizer comprising the liquid crystalline film of claim 1.

8. A linear polarizer formed by laminating the liquid crystalline film of claim 1 and a quarter-wave sheet to each other.

9. A process for fabricating the film of claim 2, characterized by transferring a diffraction pattern to a cholesteric or chiral smectic C liquid crystal layer.

10. The process of claim 9, wherein the cholesteric or chiral smectic C liquid crystal layer is formed using a liquid crystalline polymer.

11. The process of claim 10, wherein the diffraction pattern is transferred to the cholesteric or chiral smectic C liquid crystal layer in a temperature range of above a glass transition point of the liquid crystalline polymer and below an isotropic phase transition temperature of the liquid crystalline polymer and in a pressure range of 0.3 to 500 kgf/cm$^2$.

12. A light-diffusible film comprising the liquid crystalline film of claim 2.

13. A circular polarizer comprising the liquid crystalline film of claim 2.

14. A linear polarizer formed by laminating the liquid crystalline film of claim 2 and a quarter-wave sheet to each other.

* * * * *